(12) United States Patent
Park et al.

(10) Patent No.: US 8,044,589 B2
(45) Date of Patent: Oct. 25, 2011

(54) PLASMA DISPLAY DEVICE HAVING A FILTER COMPRISING AN EXTERNAL LIGHT SHIELDING SHEET

(75) Inventors: Yu Park, Seoul (KR); Tae Deok Seo, Kimchun-si (KR); Jun Hwan Ju, Kyungsangnam-do (KR)

(73) Assignee: LG Electronics Inc., Seoul (KR)

( * ) Notice: Subject to any disclaimer, the term of this patent is extended or adjusted under 35 U.S.C. 154(b) by 650 days.

(21) Appl. No.: 11/729,883

(22) Filed: Mar. 30, 2007

(65) Prior Publication Data
US 2008/0036352 A1    Feb. 14, 2008

(30) Foreign Application Priority Data

Jul. 19, 2006  (KR) .................. 10-2006-0067534
Sep. 22, 2006  (KR) .................. 10-2006-0092489

(51) Int. Cl.
| *H01J 17/49* | (2006.01) |
| *H01J 5/16*  | (2006.01) |
| *H01J 61/40* | (2006.01) |
| *H01K 1/26*  | (2006.01) |
| *H01K 1/30*  | (2006.01) |

(52) U.S. Cl. .................... 313/586; 313/112; 313/110
(58) Field of Classification Search .................. 313/110, 313/112; *H01J 17/49, 17/16*
See application file for complete search history.

(56) References Cited

U.S. PATENT DOCUMENTS

| 6,417,966 | B1 * | 7/2002 | Moshrefzadeh et al. ...... 359/453 |
| 6,657,387 | B1 | 12/2003 | Yoo |
| 7,236,286 | B2 * | 6/2007 | Clikeman et al. ............. 359/247 |
| 7,271,955 | B2 * | 9/2007 | Osawa et al. ................. 359/453 |
| 7,599,117 | B2 * | 10/2009 | Goto ............................ 359/453 |
| 2005/0174511 | A1 | 8/2005 | Sugawara et al. |
| 2006/0145578 | A1 * | 7/2006 | Park et al. ..................... 313/112 |
| 2009/0033222 | A1 * | 2/2009 | Park et al. ..................... 313/582 |

FOREIGN PATENT DOCUMENTS

| CN | 1701276 | 11/2005 |
| CN | 1800884 | 7/2006 |
| EP | 1 471 559 | 10/2004 |
| EP | 1471559 | * 10/2004 |
| EP | 1 677 336 | 7/2006 |
| EP | 1 798 749 | 6/2007 |

OTHER PUBLICATIONS

European Search Report dated Jan. 16, 2008.

* cited by examiner

*Primary Examiner* — Toan Ton
*Assistant Examiner* — Britt Hanley
(74) *Attorney, Agent, or Firm* — KED & Associates, LLP

(57) ABSTRACT

A plasma display apparatus may include an external light shielding sheet attached to a front of a panel to absorb and shield externally incident light. Accordingly, a black image can be implemented close to an original color and bright and dark room contrast can be improved. Furthermore, thickness of the external light shielding sheet and height of a pattern unit have a given ratio in order to properly secure an aperture ratio of the external light shielding sheet. Accordingly, light emitted into the panel can transmit toward a user side.

29 Claims, 12 Drawing Sheets

PLASMA DISPLAY DEVICE HAVING A FILTER COMPRISING AN EXTERNAL LIGHT SHIELDING SHEET

The present application claims priority from Korean Patent Application 10-2006-0067534, filed Jul. 19, 2006 and Korean Patent Application 10-2006-0092489, filed Sep. 22, 2006, the subject matters of which are incorporated herein by reference.

BACKGROUND

1. Field

Embodiments of the present invention may relate to a plasma display apparatus. More particularly, embodiments of the present invention may relate to a plasma display apparatus in which an external light shielding sheet is provided for shielding external light incident from outside of a panel. The external light shielding sheet may be disposed at a front of the panel to improve bright and dark room contrast of the panel.

2. Background

A plasma display panel (hereafter a "PDP") is an apparatus configured to generate discharge by applying voltage to electrodes disposed in discharge spaces and to display an image including characters and/or graphics by exciting phosphors with plasma generated during discharge of gas. The PDP may be advantageous in that it can be made large, light and thin, may provide a wide viewing angle, and may implement full colors and high luminance.

In the PDP, when a black image is implemented, external light may be reflected on a front of the panel due to white-based phosphor exposed on a lower plate of the panel. Therefore, a problem may arise because a black image is recognized as a bright-based dark color, which may result in a lower contrast.

BRIEF DESCRIPTION OF THE DRAWINGS

Embodiments may be described in detail with reference to the following drawings in which like reference numerals refer to like elements and wherein.

DETAILED DESCRIPTION

A plasma display apparatus according to example embodiments of the present invention will now be described with reference to the accompanying drawings. Embodiments of the present invention are not limited to the embodiments described in this specification.

Figure 1:
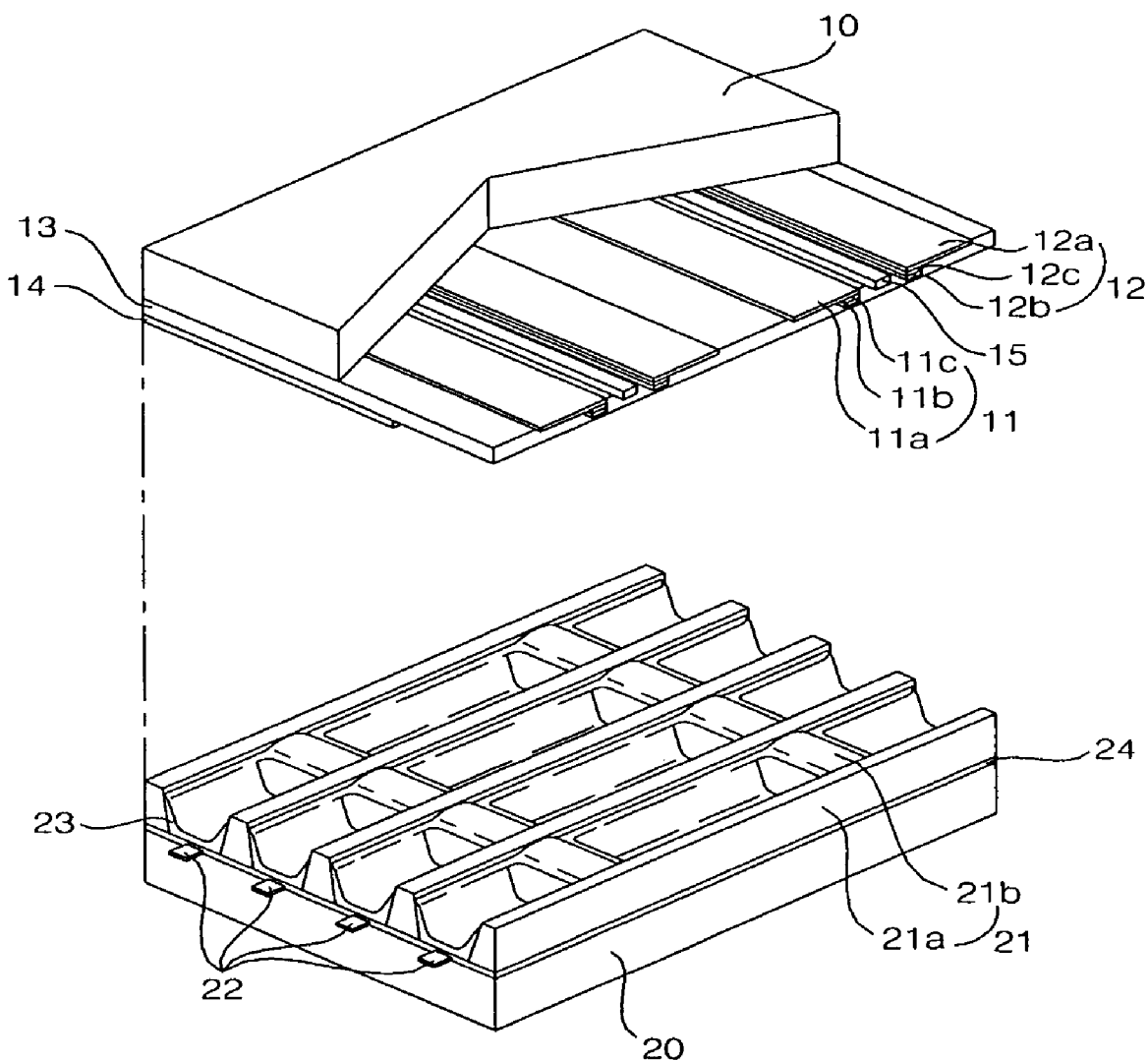
FIG. 1 is a perspective view illustrating a PDP according to an example embodiment of the present invention.

FIG. 1 is a perspective view illustrating a PDP according to an example embodiment of the present invention. Other embodiments and configurations are also within the scope of the present invention.

As shown in FIG. 1, a PDP may include a scan electrode 11 and a sustain electrode 12 (i.e., a sustain electrode pair) both of which are formed on a front substrate 10, and address electrodes 22 formed on a rear substrate 20.

The sustain electrode pair 11 and 12 includes transparent electrodes 11a and 12a and bus electrodes 11b and 12b. The transparent electrodes 11a and 12a may be formed of Indium-Tin-Oxide (ITO). The bus electrodes 11b and 12b may be formed using metal such as silver (Ag) or chrome (Cr), a stack of Cr/copper (Cu)/Cr, and/or a stack of Cr/aluminum (Al)/Cr. The bus electrodes 11b and 12b may be formed on the transparent electrodes 11a and 12a and serve to reduce a voltage drop caused by the transparent electrodes 11a and 12a having a high resistance.

The sustain electrode pair 11 and 12 may have a structure in which the transparent electrodes 11a and 12a and the bus electrodes 11b and 12b are laminated, or the structure may include only the bus electrodes 11b and 12b without the transparent electrodes 11a and 12a. Such a structure may save manufacturing cost of a panel because it does not use the transparent electrodes 11a and 12a (and/or the transparent electrodes made of ITO). The bus electrodes 11b and 12b may also be formed using a variety of materials such as a photosensitive material in addition to the materials described above.

Black matrices (BM) 15 may be arranged between the transparent electrodes 11a and 12a and the bus electrodes 11b and 12b of the scan electrode 11 and the sustain electrode 12. The black matrices 15 may have a light-shielding function of reducing reflection of external light generated outside the front substrate 10 by absorbing the external light. The black matrices may improve purity and contrast of the front substrate 10.

The black matrices 15 may be formed on the front substrate 10. Each of the black matrices 15 may include a first black matrix 15 formed at a location to overlap with a barrier rib 21 and second black matrices 11c and 12c formed between the transparent electrodes 11a and 12a and the bus electrodes 11b and 12b. The first black matrix 15 and the second black matrices 11c and 12c, also referred to as a "black layer" or a "black electrode layer", may be formed at a same time and may be physically connected or may be formed separately and not be physically connected.

In the case where the first black matrix 15 and the second black matrices 11c and 12c are physically connected to each other, the first black matrix 15 and the second black matrices 11c and 12c may be formed using a same material. However, in the event that the first black matrix 15 and the second black matrices 11c and 12c are not physically connected to each other physically, the first black matrix 15 and the second black matrices 11c and 12c may be formed using different materials.

An upper dielectric layer 13 and a protection layer 14 are laminated on the front substrate 10 in which the scan electrodes 11 and the sustain electrodes 12 are formed in parallel. Charged particles generated by a discharge are accumulated on the upper dielectric layer 13. The upper dielectric layer 13 may protect the sustain electrode pair 11 and 12. The protection layer 14 may protect the upper dielectric layer 13 from sputtering of charged particles generated during discharge of a gas and also increase emission efficiency of secondary electrons.

The address electrodes 22 are formed in such a way to cross the scan electrodes 11 and the sustain electrodes 12. A lower dielectric layer 24 and barrier ribs 21 are also formed on the rear substrate 20 on which the address electrodes 22 are formed.

A phosphor layer 23 may be formed on the lower dielectric layers 24 and surfaces of the barrier ribs 21. Each of the barrier ribs 21 may include a longitudinal barrier rib 21*a* and a traverse barrier rib 21*b* to form a closed form. The barrier ribs 21 may physically separate discharge cells and also prevent ultraviolet rays generated by a discharge and a visible ray from leaking to neighboring discharge cells.

Embodiments of the present invention are applicable to a structure of the barrier ribs 21 as shown in FIG. 1 as well as to structures of barrier ribs having a variety of shapes. For example, embodiments of the present invention may include a differential type barrier rib structure (in which the longitudinal barrier rib 21*a* and the traverse barrier rib 21*b* have different heights), a channel type barrier rib structure (in which a channel that can be used as an exhaust passage is formed in at least one of the longitudinal barrier rib 21*a* and the traverse barrier rib 21*b*), a hollow type barrier rib structure (in which a hollow is formed in at least one of the longitudinal barrier rib 21*a* and the traverse barrier rib 21*b*) and/or etc.

In the differential type barrier rib structure, the traverse barrier rib 21*b* may have a height "h" higher than a height of the longitudinal barrier rib 21*a*. In the channel type barrier rib structure or the hollow type barrier rib structure, a channel or a hollow may be formed in the traverse barrier rib 21*b*.

Meanwhile, in an example embodiment of the present invention, R, G, and B discharge cells may be arranged on a same line. However, the R, G, and B discharge cells may be arranged in different forms. For example, the R, G, and B discharge cells may also have a delta type arrangement in which the R, G and B discharge cells are arranged in a triangular form (or shape). Furthermore, the discharge cells may be arranged in a variety of forms or shapes such as a square, a pentagon and/or a hexagon.

Figure 2:
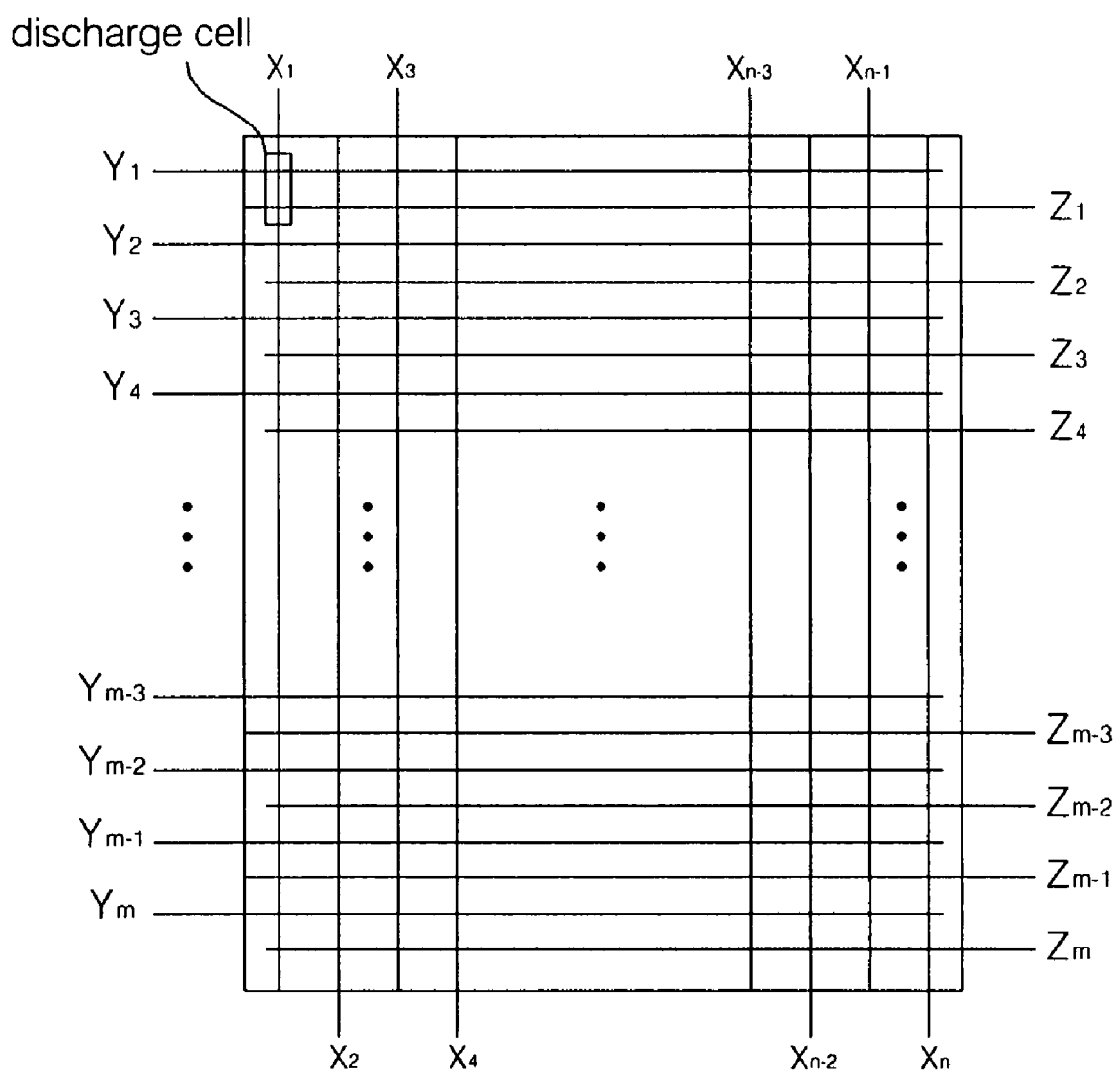
FIG. 2 is a view illustrating an electrode arrangement of a PDP according to an example embodiment of the present invention.

FIG. 2 is a view illustrating an electrode arrangement of a PDP according to an example embodiment of the present invention. Other embodiments and configurations are also within the scope of the present invention.

As shown in FIG. 2, a plurality of discharge cells constituting the PDP may be arranged in a matrix form. The plurality of discharge cells may be respectively disposed at intersections of scan electrode lines Y1 to Ym, sustain electrodes lines Z1 to Zm and address electrodes lines X1 to Xn. The scan electrode lines Y1 to Ym may be driven sequentially or simultaneously. The sustain electrode lines Z1 to Zm may be driven at a same time. The address electrode lines X1 to Xn may be divided into even-numbered lines and odd-numbered lines and driven separately, or the electrode lines may be driven sequentially.

The electrode arrangement shown in FIG. 2 is only one example embodiment of electrode arrangements of the PDP. Embodiments of the present invention are not limited to the FIG. 2 electrode arrangement and driving method. For example, embodiments of the present invention may include a dual scan method in which two of the scan electrode lines Y1 to Ym are scanned at a same time. The address electrode lines X1 to Xn may be driven by being divided into upper and lower parts about a center of the panel.

Figure 3:
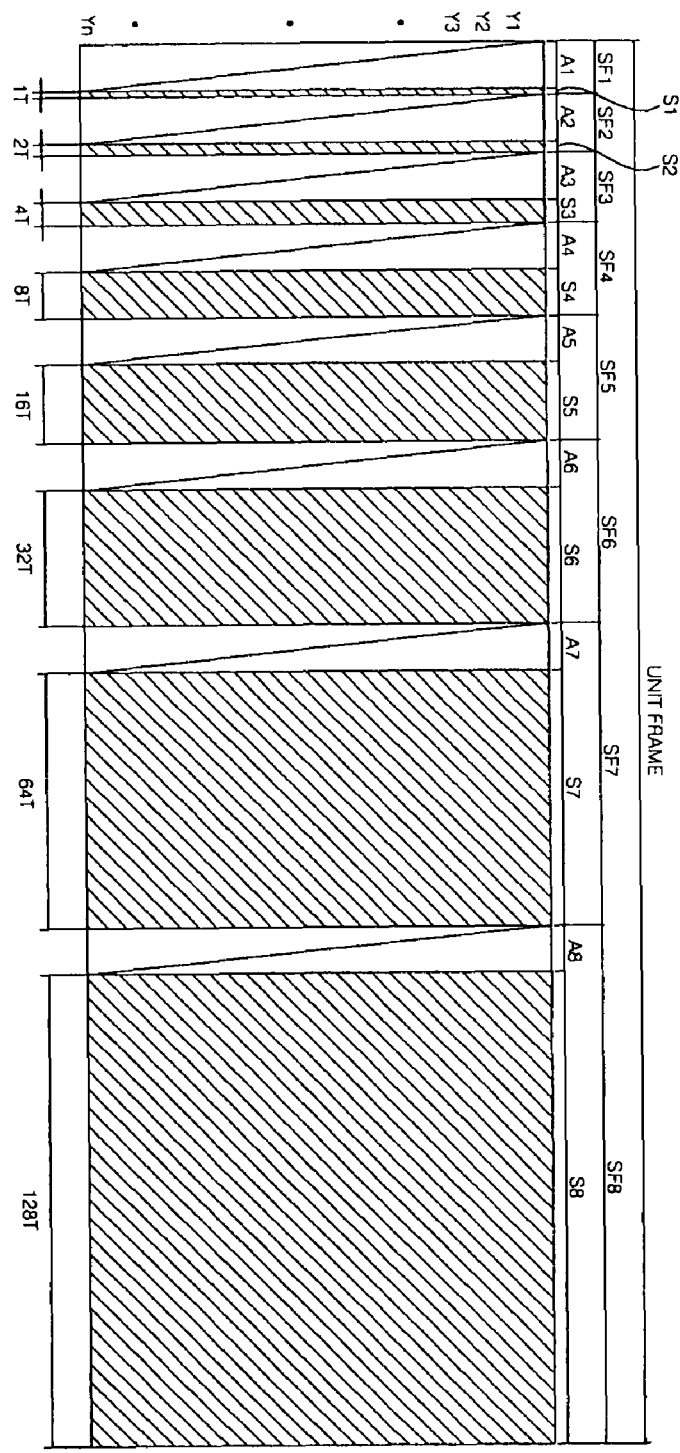
FIG. 3 is a timing diagram showing a method of driving a plasma display apparatus with one frame of an image time-divided into a plurality of subfields according to an example embodiment of the present invention.

FIG. 3 is a timing diagram showing a method of driving a PDP with one frame of an image time-divided into a plurality of subfields according to an example embodiment of the present invention. Other embodiments and configurations are also within the scope of the present invention.

As shown in FIG. 3, a unit frame may be divided into a predetermined number of sub-fields (e.g., eight subfields SF1, . . . , SF8) in order to represent gray levels of an image. Each of the subfields SF1, . . . , SF8 may be divided into a reset period (not shown), an address period (A1, . . . , A8), and a sustain period (S1, . . . , S8).

In each of the address periods A1, . . . , A8, data signals may be applied to the address electrodes X and scan pulses corresponding to the data signals may be sequentially applied to the scan electrodes Y. In each of the sustain periods S1, . . . , S8, a sustain pulse may be alternately applied to the scan electrodes Y and the sustain electrodes Z. Accordingly, a sustain discharge may be generated in discharge cells selected in the address periods A1, . . . , A8.

Luminance of the PDP may be proportional to a number of sustain discharges within the sustain periods S1, . . . , S8 in a unit frame. When one frame constituting 1 image is represented by eight subfields and 256 gray levels, a different number of sustain pulses may be sequentially allocated to each subfield in a ratio of 1, 2, 4, 8, 16, 32, 64 and 128. Furthermore, in order to obtain a luminance of 133 gray levels, cells can be addressed during the subfield1 period (SF1), the subfield3 period (SF3) and the subfield8 period (SF8), thus generating a sustain discharge.

Meanwhile, a number of sustain discharges allocated to each subfield may be variably decided depending on weights of the subfields. For example, FIG. 3 shows an example in which one frame is divided into eight subfields. However, embodiments of the present invention are not limited to this example, but rather a number of subfields constituting one frame may be changed depending on design specifications. For example, the PDP may be driven by dividing one frame into eight or more subfields, such as 12 or 16 subfields.

FIGS. 4 to 8 are cross-sectional views illustrating an external light shielding sheet according to an example embodiment of the present invention. Other embodiments and configurations are also within the scope of the present invention.

As shown in FIGS. 4 to 7, an external light shielding sheet 100 (100*a*, 100*b*, 100*c*) may include a base unit 110 and pattern units 120.

The base unit 110 may be made of a transparent plastic material (e.g., a resin-based material fabricated by a UV-hardening method) so that light can smoothly pass through the base unit 110. A robust glass material may be used as a material of the base unit 110 in order to enhance an effect of protecting the front of the panel.

Figure 4:
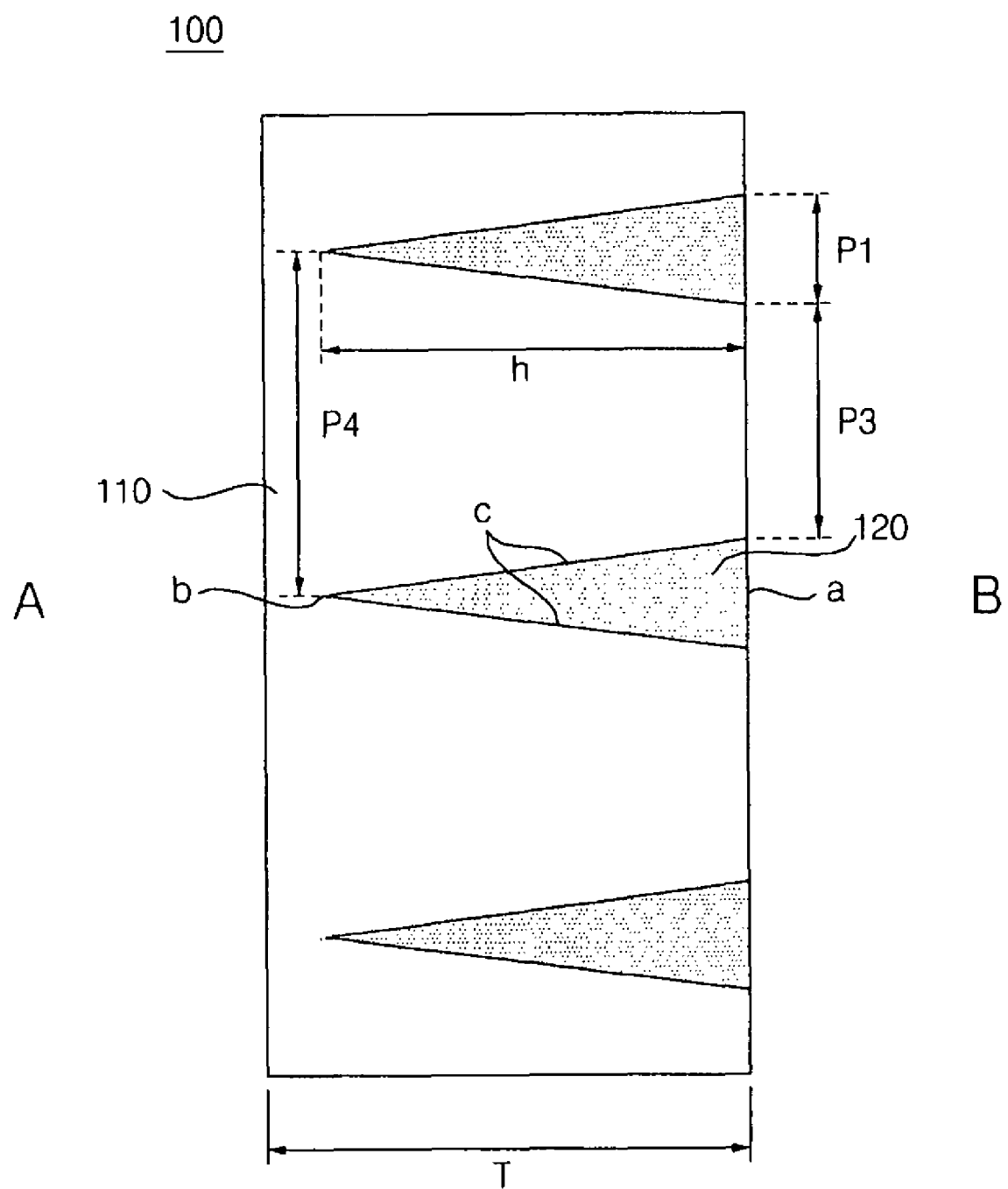
FIGS. 4 to 8 are cross-sectional views illustrating an external light shielding sheet according to example embodiments of the present invention.

Referring to FIG. 4, the pattern units 120 may be made of a material having a color darker than a color of the base unit 110. The pattern units 120 may be made of a dark material. For example, the pattern units 120 may be formed using carbon-based material or coated with dark dyes in order to absorb external light.

In FIGS. 4 to 7, a bottom "a" of the external light shielding sheet 100 is on a panel side B and a top "b" of the external light shielding sheet 100 is on a viewer side A to which external light is incident. The top "b" of the external light shielding sheet 100 may be disposed at the front of the panel. An external light source may be located over the panel and therefore the external light may be incident on the panel with inclination from the upper side of the pattern units 120.

In order to shield external light through absorption and reflect a visible ray emitted from the panel, thus increasing the reflectance of the panel light, a refractive index of each of the pattern units 120 (i.e., the refractive index of an outer circumference of the pattern units 120) may be lower than a refractive index of the base unit 110.

In order to maximize absorption and shielding of the external light incident from the panel and reflection of the panel light, the refractive index of each pattern unit 120 may be 0.300 to 0.999 times greater than a refractive index of the base unit 110.

When the external light shielding sheet 100 has a thickness T of 20 μm to 250 μm, a manufacturing process may be convenient and an adequate optical transmittance can be obtained. The thickness T of the external light shielding sheet 100 may be in a range of 100 μm to 180 μm so that light emitted from the panel may smoothly transmit through the external light shielding sheet 100, externally incident light may be refracted and effectively absorbed and blocked by the pattern units 120, and robustness of the sheet 100 may be obtained.

As shown in FIG. 4, the pattern units 120 formed on the base unit 110 may have a triangular shape such as an isosceles triangle. The pattern unit 120 may have a bottom width P1 of 18 μm to 35 μm. In this case, an aperture ratio for allowing light generated from the panel to smoothly radiate to the user side A can be obtained and external light shielding efficiency can be maximized or increased.

The pattern units 120 may have a height "h" of 80 μm to 170 μm to form an inclined surface gradient capable of effectively absorbing external light and effectively reflecting the panel light in relationship with a bottom width P1 and to prevent a short of the pattern units 120. A height "h" of the pattern unit 120 may be defined as a length from the bottom to the top of the pattern unit 120 as shown in FIG. 4.

In order to secure the aperture ratio for displaying a display image with an adequate luminance as the panel light is radiated to the user side A, and an optimal inclined surface of the pattern unit 120 for improving the external light shielding effect and panel light reflection efficiency (i.e., the gradient of upper and lower inclined surfaces of the pattern unit 120), a shortest distance P3 between two neighboring pattern units may be from 40 μm to 90 μm and a distance P4 between tops of two neighboring pattern units may be from 60 μm to 130 μm.

The shortest distance P3 between two neighboring pattern units may be substantially the same as a shortest distance between bottoms of two pattern units and a distance P4 between tops of two neighboring pattern units may be substantially the same as a shortest distance between tops of two pattern units.

For the above reasons, when a distance between two neighboring pattern units (i.e., a shortest distance P3) is 1.1 to 5 times the bottom width P1 of the pattern, unit 120, the aperture ratio for display may be secured and an external light shielding effect and panel light reflection efficiency can be enhanced.

When the height "h" of the pattern unit 120 is 0.89 to 4.25 times the shortest distance P3 between two neighboring pattern units, external light incident from the upper side of the panel with inclination may be prevented from being incident on the panel, a short of the pattern units 120 can be prevented (or minimized) and reflection efficiency of the panel light can be optimized (or increased).

When the distance P4 between the tops of two neighboring pattern units is 1 to 3.25 times the distance P3 between the bottoms of the two neighboring pattern units, the aperture ratio for displaying an image having an adequate luminance may be secured and the panel light can be totally reflected from the inclined surfaces of the pattern unit 120.

Figure 5:
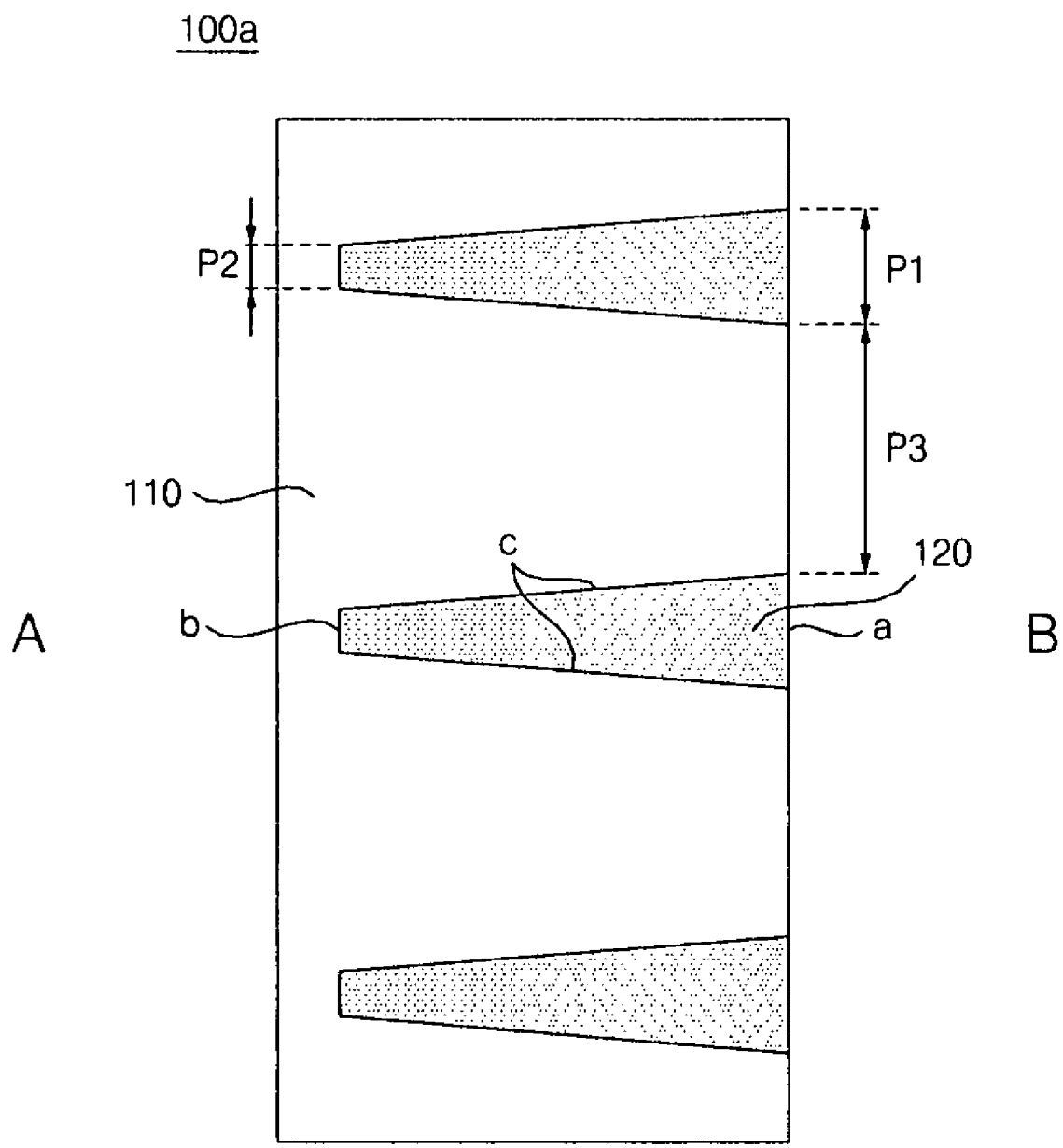

As shown in FIG. 5, each of the pattern units 120 of the external light shielding sheet 100a may have a trapezoidal shape in which the top "b" has a specific width P2. In this case, the width P2 of the top "b" may be smaller than the width P1 of the bottom "a". The width P2 of the top of the pattern unit 120 may be 9 μm or less. Accordingly, in a relationship with the bottom width P1, an inclined surface gradient that effectively enables absorption of external light and reflection of panel light may be formed.

As described above, the width may be widened from the top "b" to the bottom "a" of the pattern units 120 so that an inclined surface may be formed that has a highest aperture ratio and that can shield external light to a greatest extent possible.

The following Table 1 shows experimental results based on an aperture ratio and an external light shielding effect of an external light shielding sheet based on a bottom width P1 of the pattern unit and a width at a center (h/2) of a height of a pattern unit. In this example, the bottom width of the pattern unit is 23 μm.

TABLE 1

| Bottom Width (μm) of Pattern Unit | Center Width (μm) of Pattern Unit | Aperture Ratio (%) | External Light Shielding Effect |
|---|---|---|---|
| 23.0 | 23.0 | 50 | ○ |
| 23.0 | 22.0 | 55 | ○ |
| 23.0 | 20.0 | 60 | ○ |
| 23.0 | 18.0 | 65 | ○ |
| 23.0 | 16.0 | 70 | ○ |
| 23.0 | 14.0 | 72 | ○ |
| 23.0 | 12.0 | 75 | ○ |
| 23.0 | 10.0 | 78 | ○ |
| 23.0 | 9.0 | 80 | ○ |
| 23.0 | 8.0 | 83 | Δ |
| 23.0 | 6.0 | 85 | Δ |
| 23.0 | 5.0 | 90 | X |

As shown in Table 1, when the bottom width P1 of the pattern unit 120 of the external light shielding sheet 100 is 23.0 μm, if the width at the center (h/2) of the pattern unit is 23 μm, light emitted from interior of the panel can pass through the user side A to have the aperture ratio of 50% or more in which an image is displayed. However, if the width at the center h/2) of the pattern unit is 8 μm or less, efficiency in which external light is shielded may decrease. If the width at the center (h/2) of the pattern unit is 5 μm or less, external light can be incident on the panel.

Thus, when the width at the center (h/2) of the pattern unit of the external light shielding sheet is 1 to 3.5 or 1.5 to 2.5 times greater than the bottom width P2, external light can be prevented (or minimized) from being incident on the panel and an adequate aperture ratio may be obtained.

Figure 6:
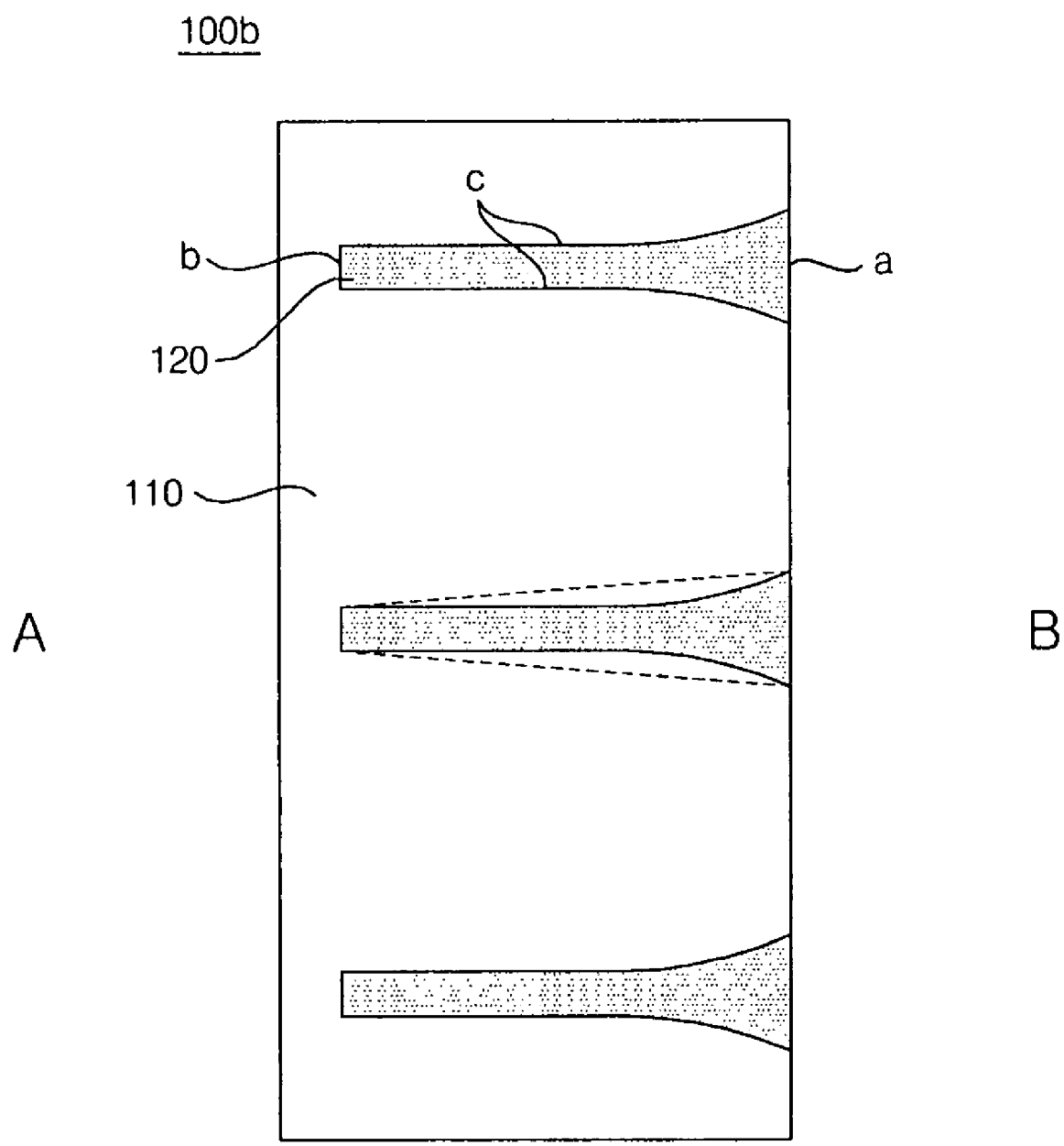

As shown in FIG. 6, the pattern unit 120 of an external light shielding sheet 100b may have a curved shape in which an inclined surface of an outer circumference is bent toward an inside of the panel. Efficiency in which external light is refracted from the inclined surface of the pattern unit to the inside of the pattern unit 120 and is thus shielded can be improved. Not only the inclined surface but also the top and bottom of the pattern unit 120 may be a curve having a specific curvature.

Furthermore, the inclined surface of the pattern unit 120 may be an inclined surface having a gradient other than a curved shape.

Figure 7:
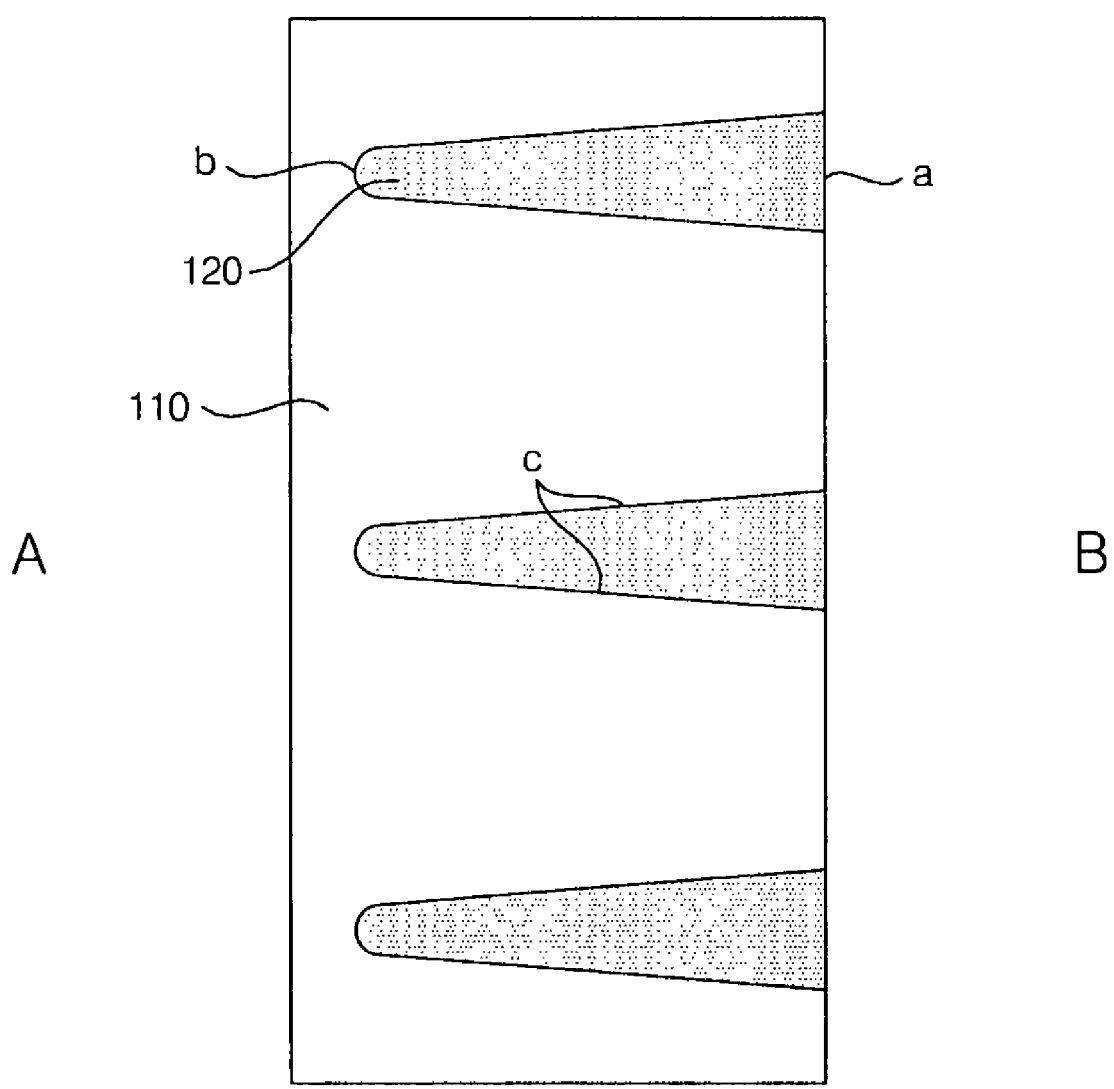

The shapes of the right and left inclined surfaces of the pattern unit 120 may be curved as shown in FIG. 6. The top "b" of the pattern unit 120 of the external light shielding sheet 100c may have a curved shape as shown in FIG. 7. This may solve a problem in which a pattern unit having a very small shape is difficult to have a triangle.

Figure 8:
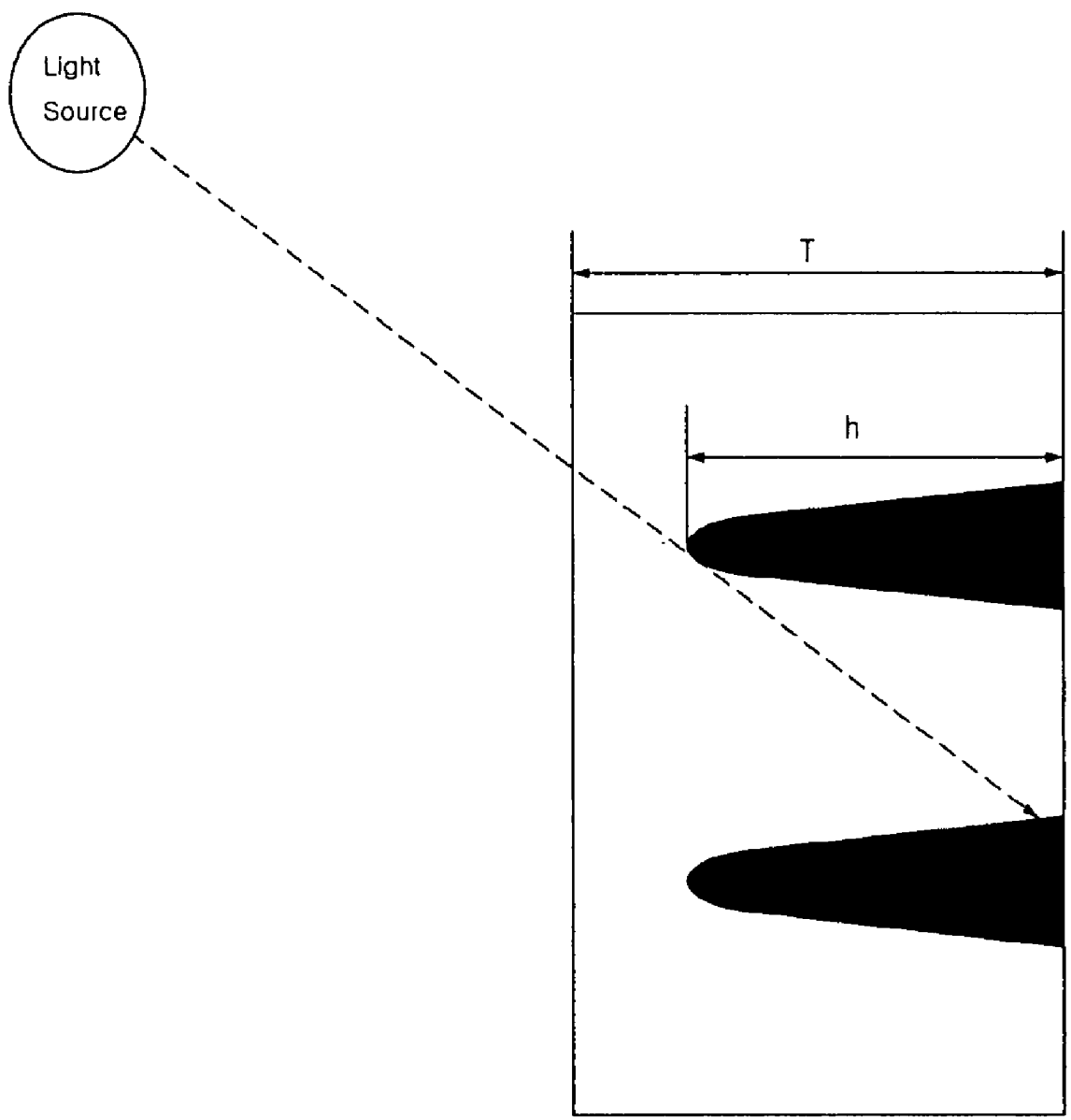

FIG. 8 is a cross-sectional view illustrating an external light shielding sheet according to an example embodiment of the present invention. Other embodiments and configurations are also within the scope of the present invention.

As shown in FIG. 8, in order to secure roughness of the external light shielding sheet including the pattern units and to secure transmittance of a visible ray emitted from the panel so as to display an image, the external light shielding sheet may have a thickness T of 100 μm to 180 μm.

When the height "h" of each of the pattern units included in the external light shielding sheet is 80 μm to 35 μm, fabrication of the pattern units may be most convenient, the external light shielding sheet may have an adequate aperture ratio, and the external light shielding effect and effect of reflecting light emitted from the panel may be maximized (or increased).

The height "h" of the pattern unit may vary depending on the thickness T of the external light shielding sheet. External light incident on the panel to affect a lowering in bright and dark room contrast may be provided from a location higher than the panel. Thus, in order to effectively shield external light incident on the panel, the height "h" of the pattern unit may have a range with respect to the thickness T of the external light shielding sheet.

As the height "h" of the pattern unit increases as shown in FIG. 8, the thickness of the base unit at the top of the pattern unit may become thin resulting in insulating breakdown. As the height "h" of the pattern unit decreases, external light having an angle range may be incident on the panel thereby hindering adequate shielding of the external light.

The following Table 2 shows experimental results of insulating breakdown and an external light shielding effect of an external light shielding sheet based on thickness T of the external light shielding sheet and height "h" of the pattern unit.

TABLE 2

| Sheet Thickness (T) | Height of Pattern Unit | Insulating Breakdown | External Light Shielding Effect |
|---|---|---|---|
| 120 μm | 120 μm | ○ | ○ |
| 120 μm | 115 μm | Δ | ○ |
| 120 μm | 110 μm | X | ○ |
| 120 μm | 105 μm | X | ○ |
| 120 μm | 100 μm | X | ○ |
| 120 μm | 95 μm | X | ○ |
| 120 μm | 90 μm | X | ○ |
| 120 μm | 85 μm | X | ○ |
| 120 μm | 80 μm | X | ○ |
| 120 μm | 75 μm | X | Δ |
| 120 μm | 70 μm | X | Δ |
| 120 μm | 65 μm | X | Δ |
| 120 μm | 60 μm | X | Δ |
| 120 μm | 55 μm | X | Δ |
| 120 μm | 50 μm | X | X |

As shown in Table 2, when the thickness T of the external light shielding sheet is 120 μm, if the height "h" of the pattern unit is 120 μm or more, a failure rate of a product may increase due to a danger that the pattern unit may experience insulating breakdown. If the height "h" of the pattern unit is 110 μm or less, a failure rate of the external light shielding sheet may decrease since there is no danger (or less danger) that the pattern unit may experience insulating breakdown. However, when the height of the pattern unit is 85 μm or less, efficiency in which external light is blocked by the pattern unit may decrease. When the height of the pattern unit is 60 μm or less, external light can be incident on the panel.

When the thickness T of the external light shielding sheet is 1.01 to 2.25 times greater than the height "h" of the pattern unit, insulating breakdown at a top portion of the pattern unit may be prevented and external light may be prevented from being incident on the panel. In order to increase an amount of reflection of light emitted from the panel and a viewing angle while preventing (or minimizing) insulating breakdown and external light from being incident on the panel, the thickness T of the external light shielding sheet may be in a range of 1.01 to 1.5 times greater than the height "h" of the pattern unit.

Figure 9:
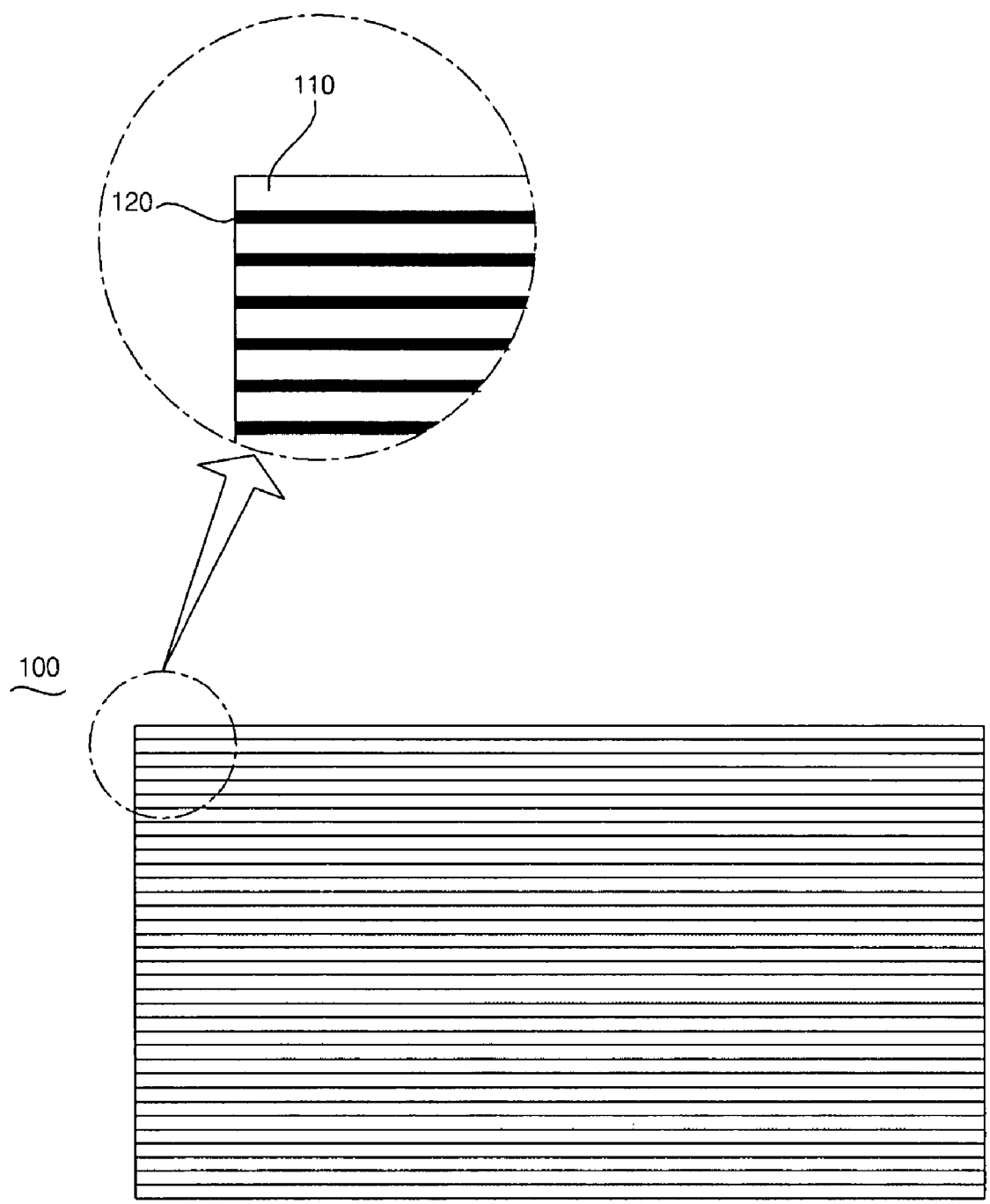
FIG. 9 is a schematic view illustrating front of an external light shielding sheet according to an example embodiment of the present invention.

FIG. 9 is a schematic view illustrating front of an external light shielding sheet according to an example embodiment of the present invention. Other embodiments and configurations are also within the scope of the present invention.

As shown in FIG. 9, in the external light shielding sheet 100, the pattern units 120 may be formed in parallel on the base unit 110 at given intervals. However, embodiments of the present invention are not limited thereto as other pattern units may be further formed in a direction to cross the pattern units 120.

Furthermore, in order to prevent a Moire phenomenon that may be generated due to interference of the black matrix, the black layer, the barrier ribs, and the bus electrodes formed within the panel and the pattern units, the pattern units 120 may be inclined from top or bottom of the external light shielding sheet at a given angle.

Moire phenomenon refers to patterns of a low frequency that may occur as patterns of a similar lattice shape are overlapped. For example, the Moire phenomenon may refer to wave patterns appearing when mosquito nets are overlapped.

The following Table 3 shows experimental results of whether the Moire phenomenon and an external light shielding effect have occurred based on a ratio of the bottom width P1 of the pattern unit and the width of a bus electrode formed on the front substrate of the panel. In this example, the width of the bus electrode is 90 μm.

TABLE 3

| Bottom Width of Pattern Unit/Width of Bus Electrode | Moire Phenomenon | External Light Shielding Effect |
|---|---|---|
| 0.10 | Δ | X |
| 0.15 | Δ | X |
| 0.20 | X | Δ |
| 0.25 | X | ○ |
| 0.30 | X | ○ |
| 0.35 | X | ○ |
| 0.40 | X | ○ |
| 0.45 | X | ○ |
| 0.50 | Δ | ○ |
| 0.55 | ○ | ○ |
| 0.60 | ○ | ○ |

As shown in Table 3, if the bottom width of the pattern unit is 0.2 to 0.5 times greater than the width of the bus electrode, then the Moire phenomenon can be reduced and external light incident on the panel can be decreased. In order to prevent the Moire phenomenon and effectively shield external light while securing the aperture ratio for radiating panel light, the bottom width of the pattern unit may be 0.25 to 0.4 times greater than the width of the bus electrode.

TABLE 4

| Bottom Width of Pattern Unit/Top Width of Longitudinal Barrier Rib | Moire Phenomenon | External Light Shielding Effect |
|---|---|---|
| 0.10 | ○ | X |
| 0.15 | Δ | X |
| 0.20 | Δ | X |
| 0.25 | Δ | X |
| 0.30 | X | Δ |
| 0.35 | X | Δ |
| 0.40 | X | ○ |
| 0.45 | X | ○ |
| 0.50 | X | ○ |
| 0.55 | X | ○ |
| 0.60 | X | ○ |
| 0.65 | X | ○ |
| 0.70 | Δ | ○ |
| 0.75 | Δ | ○ |
| 0.80 | Δ | ○ |
| 0.85 | ○ | ○ |
| 0.90 | ○ | ○ |

As shown in Table 4, when the bottom width of the pattern unit is 0.3 to 0.8 times greater than the width of the longitudinal barrier rib, the Moire phenomenon can be reduced and external light incident on the panel can be decreased. In order to prevent or reduce the Moire phenomenon and also effectively shield external light while securing the aperture ratio for discharging the panel light, the bottom width of the pattern unit may be 0.4 to 0.65 times greater than the width of the longitudinal barrier rib.

FIGS. 10 to 13 are cross-sectional views illustrating a filter according to an example embodiment of the present invention. Other embodiments and configurations are also within the scope of the present invention. A filter 200 formed at a front of the PDP may include an anti-reflection (AR)/near infrared (NIR) sheet 210, an electromagnetic interference (EMI) shielding sheet 220, an external light shielding sheet 230, an optical characteristic sheet, and/or etc.

As shown in FIGS. 10 to 13, an AR/NIR sheet 210 may include an AR layer 211 disposed at a front of a base sheet 213 made of a transparent plastic material and a NIR shielding layer 212 disposed at a rear of the base sheet 213. The AR layer 211 may prevent (or minimize) externally incident light from reflecting therefrom and thereby decrease a glaring phenomenon. The NIR shielding layer 212 may shield NIR radiated from the panel so that signals transferred using infrared rays (e.g., a remote controller) can be transferred normally.

The base sheet 213 may be formed using a variety of materials based on use conditions or transparency, insulating properties, heat-resistance properties, mechanical strength, etc. For example, the base sheet 213 may be made of poly polyester-based resin, polyamid-based resin, polyolefin-based resin, vinyl-based resin, acryl-based resin, cellulose-based resin, and/or etc. The base sheet 213 may also be formed using a polyester-based material such as polyethylene tereophthalate (PET) and polyethylene naphthalate (PEN) having good transparency and transmittance of a visible ray of 80% or more. The thickness of the base sheet 213 may be in a range of 50 μm to 500 μm considering that it can prevent or minimize damage to the sheet by overcoming weak mechanical strength and save cost by having a necessary thickness.

The AR layer 211 may include an anti-reflection layer. The NIR shielding layer 212 may be formed using an NIR absorbent that can be utilized and in which NIR transmittance of a wavelength band of 800 to 1100 nm emitted from the PDP is 20% or less, and preferably 10% or less. The NIR absorbent may be formed using materials such as NIR absorbent pigments having a high optical transmittance of a visible ray region (e.g., polymethine-base, cyanine-based compound, phthalocyanine-based compound, naphthalocyanine-based compound, buthalocyanine-based compound, anthraquinone-based compound, dithiol-based compound, imonium-based compound, and/or diimmonium-based compound).

An EMI shielding sheet 220 may include an EMI shielding layer 221 disposed at a front of a base sheet 222 made of a transparent plastic material. The EMI shielding layer 221 may shield EMI to thereby prevent EMI radiated from the panel from being emitting externally. The EMI shielding layer 221 may be formed to have a mesh structure using a conductive material.

In order to ground the EMI shielding layer 221, a conductive material may be coated on an outside of the pattern (i.e., an invalid region of the EMI shielding sheet 220 on which an image is not displayed). Materials of the metal layer forming the pattern of the EMI shielding sheet 220 may include metal with an enough conductivity to shield electronic waves such as gold, silver, iron, nickel, chrome and/or aluminum. The materials may be used as a single material, an alloy or multiple layers.

If a black oxidization process is performed on the bottom of the pattern, bright and dark room contrast of a panel, such as the black matrix formed within the panel, can be improved. The black oxidization process may be performed on at least one side of an outer circumference of the pattern so that it has a color darker than the base unit. In this case, when external light such as sunlight or electrical light is incident on the panel, the blackened portion can prohibit and/or absorb reflection to thereby improve a display image of the PDP with a high contrast.

The black oxidization process may include a plating method. In this case, the black oxidization process may be easily performed on all the surfaces of the pattern since adherence force of the plating method is excellent. The plating materials may include one or more compounds selected from copper, cobalt, nickel, zinc, tin and/or chrome, for example, as well as oxide compounds such as copper oxide, copper dioxide and oxidized steel.

The pattern width of the EMI shielding layer 221 may be 10 μm to 30 μm. In this case, a sufficient electrical resistance value for EMI shielding can be obtained and the aperture ratio for an adequate optical transmittance can be secured.

An external light source may exist in a room, outside the room or over a head of a user. An external light shielding sheet 230 may be used to represent a black image of the PDP as dark by effectively shielding the external light.

An adhesive 240 may be formed between the AR/NIR sheet 210, the EMI shielding sheet 220, and the external light shielding sheet 230 so that each of the sheets 210, 220, 230 forming the filter 200 can be firmly adhered at the front of the panel. The base sheets 213, 222 may be included between the respective sheets and may be formed using substantially a same material by taking convenience of fabrication of the filter 200 into consideration.

Figure 10:
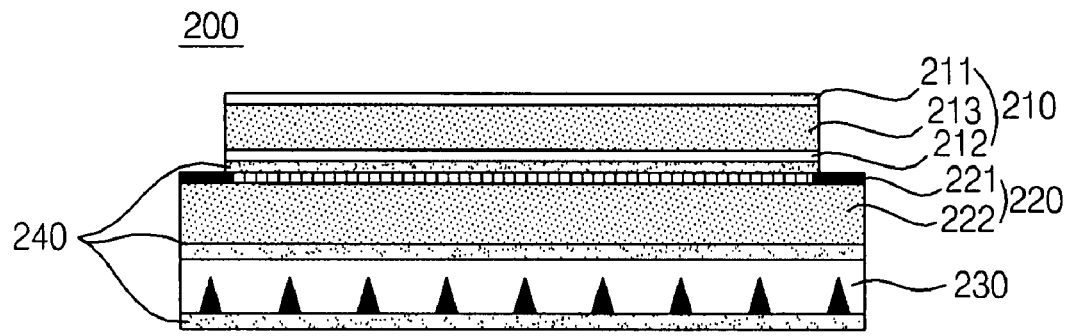
FIGS. 10 to 13 are cross-sectional views illustrating a filter according to an example embodiment the present invention.
Figure 11:
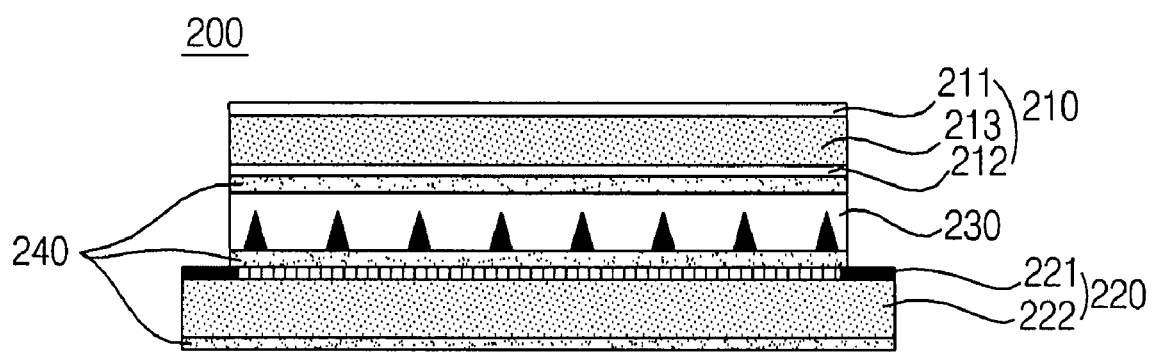

As shown in FIG. 10, the AR/NIR sheet 210, the EMI shielding sheet 220 and the external light shielding sheet 230 may be sequentially laminated. However, as shown in FIG. 11, the AR/NIR sheet 210, the external light shielding layer 230 and the EMI shielding sheet 220 may be sequentially laminated. The lamination sequence of the respective sheets may be changed. Additionally, at least one of the sheets 210, 220 or 230 may be omitted.

Figure 12:
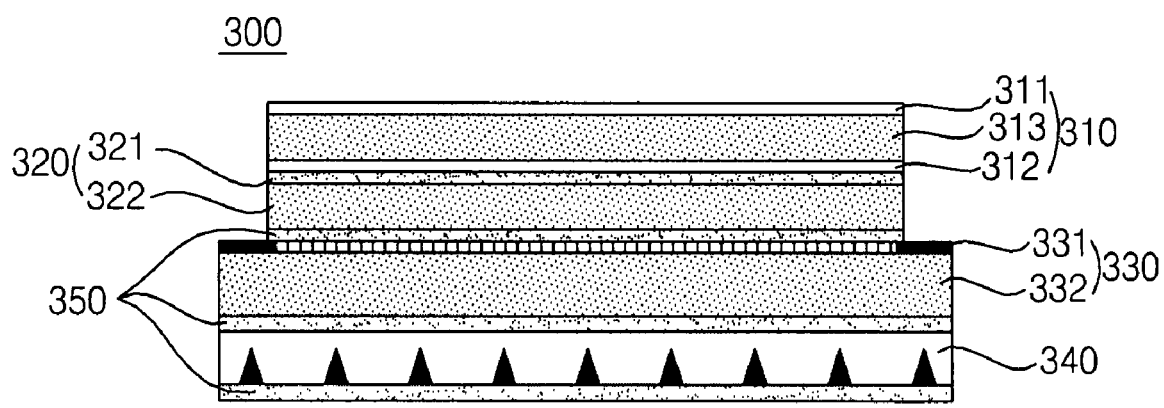
Figure 13:
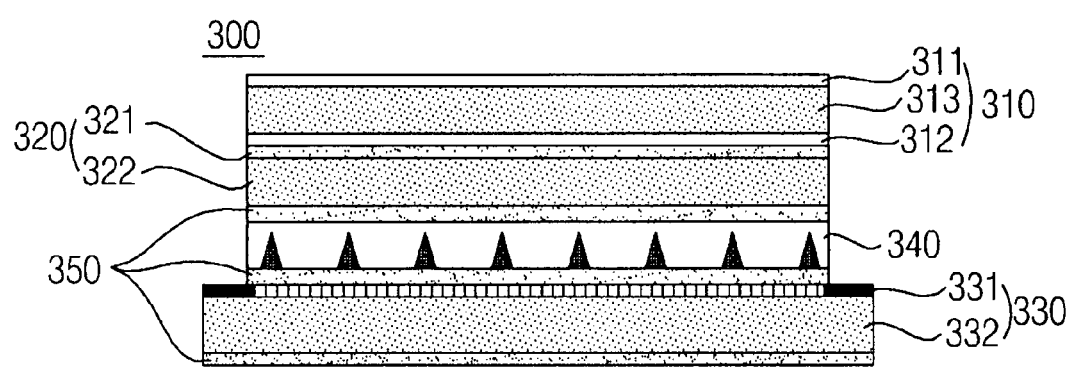

As shown in FIGS. 12 and 13, a filter 300 disposed at a front of a panel may include an AR/NIR sheet 310, an optical characteristic sheet 320, an EMI shielding sheet 330 and an external light shielding sheet 340. The optical characteristic sheet 320 may improve a color temperature and a luminance characteristic of light incident from the panel. The optical characteristic sheet 320 may include a base sheet 322 made of a transparent plastic material and an optical characteristic layer 321 made of dyes and an adhesive 350 may be laminated at a front or rear of the base sheet 322.

The AR/NIR sheet 310 may include an AR layer 311 disposed at a front of a base sheet 313 (made of transparent plastic material) and a NIR shielding layer 312 disposed at a rear of the base sheet 313. The EMI shielding sheet 330 may include an EMI shielding layer 331 disposed at a front of a base sheet 332 (made of transparent plastic material).

An external light source may exist in a room, outside the room or over a head of a user. An external light shielding sheet 340 may be used to represent a black image of the PDP as dark by effectively shielding the external light.

Adhesive 350 may be formed between the AR/NIR sheet 310, the optical characteristic sheet 320, the EMI shielding sheet 330 and/or the external light shielding sheet 340 so that each of the sheets 310, 320, 330, 340 forming the filter 300 can be firmly adhered at the front of the panel. The base sheets 313, 322, 332 may be included between the respective sheets and may be formed using substantially a same material by taking convenience of fabrication of the filter into consideration.

One of the base sheets included in each of the sheets shown in FIGS. 10 to 13 may also be omitted. Additionally, one of the base sheets may be formed using glass rather than plastic material in order to improve protection of the panel. The glass may be spaced apart from the panel at a given distance.

Figure 14:
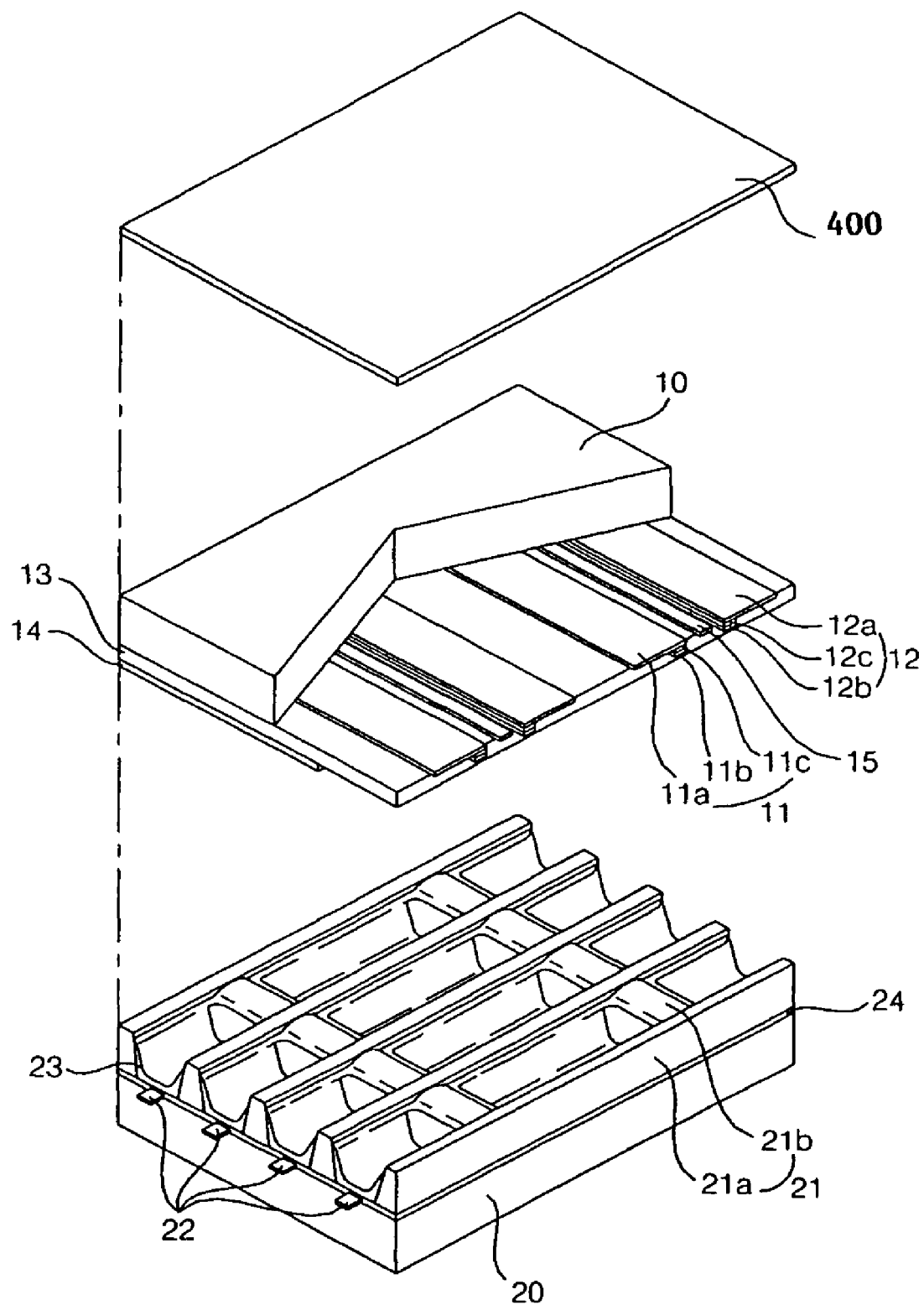
FIG. 14 is a perspective view of a plasma display apparatus according to an example embodiment of the present invention.

FIG. 14 is a perspective view showing a plasma display apparatus according to an example embodiment of the present invention. Other embodiments and configurations are also within the scope of the present invention.

As shown in FIG. 14, a filter 400 may be formed at a front of the PDP. The filter 400 may include an external light shielding sheet, an AR sheet, a NIR shielding sheet, an EMI shielding sheet, an optical characteristic sheet and/or etc, as discussed above.

An adhesive layer having a thickness of 10 to 30 μm may be layered between the filter 400 and the panel to facilitate the attachment of the panel and the filter 400 and also to increase the adhesive property. In order to protect the panel from external pressure, etc., an adhesive layer having a thickness of 30 μm to 120 μm may be formed between the filter 400 and the panel.

As described above, in accordance with an example embodiment of a plasma display apparatus, external light incident on a panel can be shielded and bright and dark room contrast can be improved. In order to improve bright and dark room contrast of a PDP, a black matrix and an anti-reflection layer attached to a filter may be used. External light incident on discharge cells of the panel can be effectively shielded. Accordingly, bright and dark room contrast of the panel can be significantly improved.

Embodiments of the present invention may provide a plasma display apparatus including an external light shielding sheet to prevent reflection of light by effectively shielding external light incident on a PDP, significantly enhancing bright and dark room contrast of the PDP, and/or improve luminance of the PDP.

A plasma display apparatus according to an example embodiment of the present invention may include a PDP and a filter disposed at a front of the PDP. The filter may include an external light shielding sheet including a base unit and a plurality of pattern units formed on the base unit. A thickness of the external light shielding sheet may be in a range of 1.01 to 2.25 times greater than a height of each of the pattern units. The thickness of the external light shielding sheet may also be in a range of 1.01 to 1.5 times greater than a height of each of the pattern units.

Furthermore, a refractive index of the pattern unit may be 0.300 to 0.999 times greater than a refractive index of the base unit. A bottom width of the pattern unit may be 1 to 3.5 times greater than a height (½) at a center of a height of the pattern unit. A shortest distance between neighboring pattern units may be 1.1 to 5 times greater than a bottom width of the pattern unit. The height of the pattern unit may be 0.89 to 4.25 times greater than a shortest distance between neighboring pattern units. A distance between tops of neighboring pattern units may be 1 to 3.25 times greater than a shortest distance between neighboring pattern units. The filter may include at least one of an anti-reflection layer configured to prevent reflection of external light, an NIR shielding layer configured to shield NIR radiated from the PDP, and an EMI shielding layer configured to shield EMI.

A filter according to an example embodiment of the present invention may include an external light shielding sheet including a base unit and pattern units formed on the base unit and having a refractive index lower than a refractive index of the base unit. A thickness of the external light shielding sheet may be in a range of 1.01 to 2.25 times greater than a height of each of the pattern units.

An external light shielding sheet configured to absorb and shield externally incident light to a greatest extent possible may be attached to a front of a panel. Accordingly, a black image can be implemented close to an original color, and bright and dark room contrast can be improved.

Furthermore, thickness of the external light shielding sheet and height of a pattern unit may have a given ratio in order to properly secure an aperture ratio of the external light shielding sheet. Accordingly, light emitted into the panel can transmit toward a user side to a greatest extent possible.

While the present description relates to the particular illustrative embodiments, it is not to be restricted by the embodiments but only by the appended claims. It is to be appreciated that those skilled in the art can change or modify the embodiments without departing from the scope and spirit of the present invention.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A plasma display apparatus comprising:
   a plasma display panel (PDP); and
   a filter provided at a front of the PDP, the filter including an external light shielding sheet including a base unit and a plurality of pattern units formed on the base unit, and a thickness of the external light shielding sheet is 1.01 to 2.25 times greater than a height of one of the pattern units,
   wherein a bottom width of the one pattern unit is 1.5 to 2.5 times greater than a width at a center of the height of the one pattern unit, and
   wherein each of the plurality of pattern units has a top and a bottom that is wider than the top, the top has a curved shape, and the bottom faces to the PDP.

2. The plasma display apparatus of claim 1, wherein the thickness of the external light shielding sheet is 1.01 to 1.5 times greater than the height of the one pattern unit.

3. The plasma display apparatus of claim 1, wherein a refractive index of the one pattern unit is less than a refractive index of the base unit.

4. The plasma display apparatus of claim 1, wherein a refractive index of the one pattern unit is 0.300 to 0.999 times greater than a refractive index of the base unit.

5. The plasma display apparatus of claim 1, wherein a shortest distance between neighboring pattern units is 1.1 to 5 times greater than the bottom width of the one pattern unit.

6. The plasma display apparatus of claim 1, wherein a shortest distance between neighboring pattern units is 1.5 to 3.5 times greater than the bottom width of the one pattern unit.

7. The plasma display apparatus of claim 1, wherein the height of the one pattern unit is 0.89 to 4.25 times greater than a shortest distance between neighboring pattern units.

8. The plasma display apparatus of claim 1, wherein the height of the one pattern unit is 1.5 to 3 times greater than a shortest distance between neighboring pattern units.

9. The plasma display apparatus of claim 1, wherein a distance between tops of neighboring pattern units is 1 to 3.25 times greater than a shortest distance between neighboring pattern units.

10. The plasma display apparatus of claim 1, wherein a distance between tops of neighboring pattern units is 1.2 to 2.5 times greater than a shortest distance between neighboring pattern units.

11. The plasma display apparatus of claim 1, wherein the filter includes at least one of an anti-reflection layer to minimize reflection of external light, a near infrared (NIR) shielding layer to shield radiated NIR, and an electromagnetic interference (EMI) shielding layer to shield EMI.

12. An apparatus comprising:
    a plasma display panel; and
    a filter provided at a front of the PDP, the filter having an external light shielding sheet that includes a base unit and pattern units formed on the base unit, the pattern units having a refractive index lower than a refractive index of the base unit, wherein a thickness of the external light shielding sheet is in a range of 1.01 to 2.25 times greater than a height of one of the pattern units,
    wherein a shortest distance between neighboring pattern units is 1.1 to 5 times greater than a bottom width of the one pattern unit,
    wherein the bottom width of the one pattern unit is 1 to 3.5 times greater than a width at a center of the height of the one pattern unit,
    wherein each of the plurality of pattern units has a top and a bottom that is wider than the top, the top has a curved shape, and the bottom faces to the PDP.

13. The apparatus of claim 12, wherein the thickness of the external light shielding sheet is 1.01 to 1.5 times greater than the height of one of the pattern units.

14. The apparatus of claim 12, wherein the height of the one pattern unit is 0.89 to 4.25 times greater than the shortest distance between neighboring pattern units.

15. The apparatus of claim 12, wherein a distance between tops of neighboring pattern units is 1 to 3.25 times greater than the shortest distance between neighboring pattern units.

16. The apparatus of claim 12, further comprising at least one of an anti-reflection layer to minimize reflection of external light, a near infrared (NIR) shielding layer to shield NIR, and an electromagnetic interference (EMI) shielding layer to shield EMI.

17. A plasma display apparatus comprising:
    a plasma display panel (PDP); and
    a filter provided at one side of the PDP, the filter including an external light shielding sheet having a base unit and a plurality of pattern units formed on the base unit, wherein a refractive index of the base unit is greater than the refractive index of one of the pattern units, and wherein a bottom width of one pattern unit is 1.5 to 2.5 times greater than a width at a center of a height of the one pattern unit,
    wherein each of the plurality of pattern units has a top and a bottom that is wider than the top, the top has a curved shape, and the bottom faces to the PDP.

18. The plasma display apparatus of claim 17, wherein a thickness of the external light shielding sheet is in a range of 1.01 to 2.25 times greater than the height of the one pattern unit.

19. The plasma display apparatus of claim 17, wherein a refractive index of the one pattern unit is 0.300 to 0.999 times greater than a refractive index of the base unit.

20. The plasma display apparatus of claim 17, wherein a shortest distance between neighboring pattern units is 1.1 to 5 times greater than the bottom width of the one pattern unit.

21. The plasma display apparatus of claim 17, wherein the height of the one pattern unit is 0.89 to 4.25 times greater than a shortest distance between neighboring pattern units.

22. The plasma display apparatus of claim 17, wherein a distance between tops of neighboring pattern units is 1 to 3.25 times greater than a shortest distance between neighboring pattern units.

23. The plasma display apparatus of claim 17, wherein the filter includes at least one of an anti-reflection layer, a near infrared (NIR) shielding layer, and an electromagnetic interference (EMI) shielding layer.

24. The plasma display apparatus of claim 1, wherein the PDP includes bus electrodes formed on a front substrate and address electrodes formed on a rear substrate, and
    wherein the bottom width of the one pattern unit is 0.25 to 0.4 times greater than a width of one of the bus electrodes.

25. The plasma display apparatus of claim 1, wherein the PDP includes a front substrate, a rear substrate, and barrier ribs between the front substrate and the rear substrate,
    wherein the barrier ribs include a longitudinal barrier rib and a traverse barrier rib crossing the longitudinal barrier rib, and
    wherein the bottom width of the one pattern unit is 0.4 to 0.65 times greater than a width of the longitudinal barrier rib.

26. The plasma display apparatus of claim 12, wherein the PDP includes bus electrodes formed on a front substrate and address electrodes formed on a rear substrate, wherein the bottom width of the one pattern unit is 0.25 to 0.4 times greater than a width of one of the bus electrodes.

27. The plasma display apparatus of claim 12, wherein the PDP includes a front substrate, a rear substrate, and barrier ribs between the front substrate and the rear substrate,
   wherein the barrier ribs include a longitudinal barrier rib and a traverse barrier rib crossing the longitudinal barrier rib, and
   wherein the bottom width of the one pattern unit is 0.4 to 0.65 times greater than a width of the longitudinal barrier rib.

28. The plasma display apparatus of claim 17, wherein the PDP includes bus electrodes formed on a front substrate and address electrodes formed on a rear substrate,
   wherein the bottom width of the one pattern unit is 0.25 to 0.4 times greater than a width of one of the bus electrodes.

29. The plasma display apparatus of claim 17, wherein the PDP includes a front substrate, a rear substrate, and barrier ribs between the front substrate and the rear substrate,
   wherein the barrier ribs include a longitudinal barrier rib and a traverse barrier rib crossing the longitudinal barrier rib, and
   wherein the bottom width of the one pattern unit is 0.4 to 0.65 times greater than a width of the longitudinal barrier rib.

* * * * *